United States Patent
Seo et al.

(10) Patent No.: US 10,750,190 B2
(45) Date of Patent: Aug. 18, 2020

(54) VIDEO DECODING METHOD AND DEVICE IN VIDEO CODING SYSTEM

(71) Applicant: LG ELECTRONICS INC., Seoul (KR)

(72) Inventors: Jungdong Seo, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/340,463

(22) PCT Filed: Jun. 9, 2017

(86) PCT No.: PCT/KR2017/005999
§ 371 (c)(1),
(2) Date: Apr. 9, 2019

(87) PCT Pub. No.: WO2018/070632
PCT Pub. Date: Apr. 19, 2018

(65) Prior Publication Data
US 2020/0053364 A1 Feb. 13, 2020

Related U.S. Application Data

(60) Provisional application No. 62/406,411, filed on Oct. 11, 2016.

(51) Int. Cl.
*H04N 19/176* (2014.01)
*H04N 19/70* (2014.01)
*H04N 19/85* (2014.01)

(52) U.S. Cl.
CPC ........... *H04N 19/176* (2014.11); *H04N 19/70* (2014.11); *H04N 19/85* (2014.11)

(58) Field of Classification Search
CPC ............................ H04N 19/176; H04N 19/70
See application file for complete search history.

(56) References Cited

U.S. PATENT DOCUMENTS 10,142,648 B2 * 11/2018 Lee ..................... H04N 19/187
2009/0238269 A1 * 9/2009 Pandit ................. H04N 19/597
375/240.12

(Continued)

FOREIGN PATENT DOCUMENTS

| KR | 10-2015-0052259 A | 5/2015 |
| KR | 10-1571341 A | 11/2015 |
| KR | 10-2016-0033884 A | 3/2016 |

*Primary Examiner* — Irfan Habib
(74) *Attorney, Agent, or Firm* — Dentons US LLP

(57) ABSTRACT

According to the present invention, a method by which a decoding device performs video decoding comprises the steps of: parsing a merge index of a current block; configuring a merge candidate list on the basis of neighboring blocks; selecting a merge candidate indicated by the merge index among merge candidates included in the merge candidate list; deriving L0 motion information and L1 motion information of the current block on the basis of the selected merge candidate; deriving an L0 weight and an L1 weight of the current block; and generating a prediction sample of the current block by weighted-summing an L0 reference sample and an L1 reference sample on the basis of the L0 weight and the L1 weight.

9 Claims, 9 Drawing Sheets

(56) References Cited

U.S. PATENT DOCUMENTS

| | | | | |
|---|---|---|---|---|
| 2010/0329334 A1* | 12/2010 | Kim | ............... | H04N 19/105 375/240.12 |
| 2011/0261882 A1* | 10/2011 | Zheng | ............... | H04N 19/105 375/240.13 |
| 2012/0320984 A1* | 12/2012 | Zhou | ............... | H04N 19/50 375/240.16 |
| 2014/0072041 A1* | 3/2014 | Seregin | ............... | H04N 19/105 375/240.13 |
| 2014/0233651 A1* | 8/2014 | Nakamura | ............... | H04N 19/593 375/240.16 |
| 2015/0103897 A1* | 4/2015 | Kim | ............... | H04N 19/593 375/240.12 |

* cited by examiner

FIG. 6
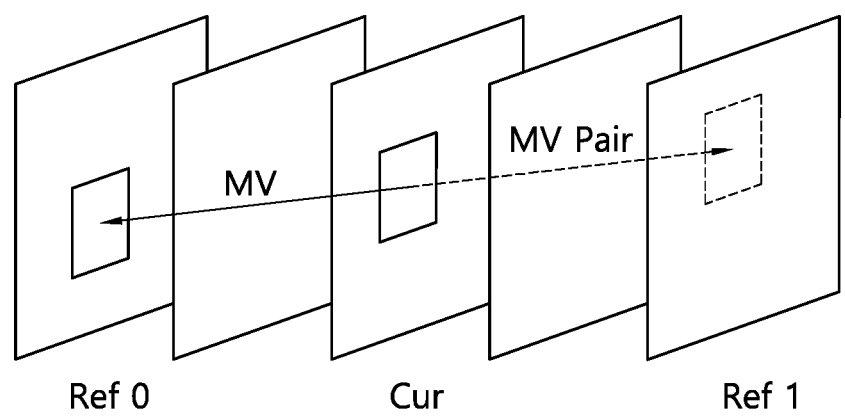
(a)
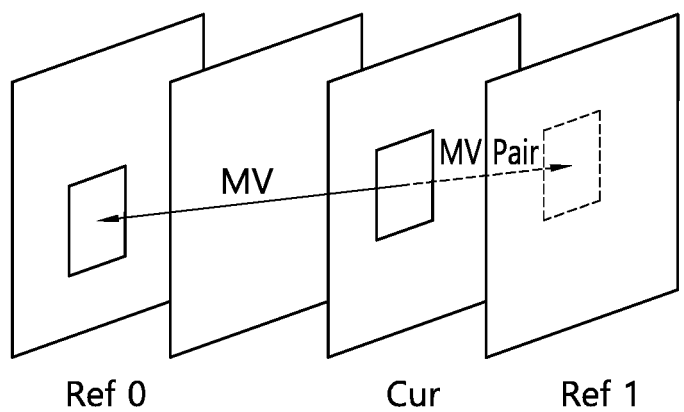
(b)

VIDEO DECODING METHOD AND DEVICE IN VIDEO CODING SYSTEM

CROSS-REFERENCE TO RELATED APPLICATIONS

This application is the National Stage filing under 35 U.S.C. 371 of International Application No. PCT/KR2017/005999, filed on Jun. 9, 2017, which claims the benefit of U.S. Provisional Application No. 62/406,411 filed on Oct. 11, 2016, the contents of which are all hereby incorporated by reference herein in their entirety.

BACKGROUND OF THE INVENTION

Field of the Invention

The present disclosure relates to video coding techniques, and more particularly to video decoding methods and devices in video coding systems.

Related Art

Demand for high-resolution, high-quality images such as HD (High Definition) images and UHD (Ultra High Definition) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE INVENTION

One technical purpose of the present disclosure is to provide a method and device for improving video coding efficiency.

Another technical purpose of the present disclosure is to provide an inter prediction method and device that performs prediction by applying weights to L0 motion information and L1 motion information of a current block respectively.

Still another technical purpose of the present disclosure is to provide a method and device for deriving L0 motion information and L1 motion information of a current block.

Still another technical purpose of the present disclosure is to provide a method and device for deriving weights for L0 motion information and L1 motion information of a current block.

In one aspect of the present disclosure, there is provided a video decoding method performed by a decoding device, the method comprising: parsing a merge index for a current block; configuring a merge candidate list based on neighboring blocks to the current block; selecting a merge candidate indicated by the merge index among merge candidates included in the merge candidate list; deriving L0 motion information and L1 motion information about the current block based on the selected merge candidate; deriving a L0 reference sample based on the L0 motion information; deriving a L1 reference sample based on the L1 motion information; deriving a L0 weight and a L1 weight for the current block; and weighted-summing the L0 reference sample and the L1 reference sample based on the L0 weight and the L1 weight to generate a predicted sample of the current block.

In another aspect of the present disclosure, there is provided a device for decoding a video, wherein the device comprises: an entropy-decoder configured for parsing a merge index for a current block; and a predicting module configured for: configuring a merge candidate list based on neighboring blocks to the current block; selecting a merge candidate indicated by the merge index among merge candidates included in the merge candidate list; deriving L0 motion information and L1 motion information about the current block based on the selected merge candidate; deriving a L0 reference sample based on the L0 motion information; deriving a L1 reference sample based on the L1 motion information; deriving a L0 weight and a L1 weight for the current block; and weighted-summing the L0 reference sample and the L1 reference sample based on the L0 weight and the L1 weight to generate a predicted sample of the current block.

In still another aspect of the present disclosure, there is provided a video encoding method performed by an encoding device, the method comprising: configuring a merge candidate list based on neighboring blocks to the current block; deriving L0 motion information and L1 motion information about the current block based on one among merge candidates included in the merge candidate list; deriving a L0 reference sample based on the L0 motion information; deriving a L1 reference sample based on the L1 motion information; deriving a L0 weight and a L1 weight for the current block; weighted-summing the L0 reference sample and the L1 reference sample based on the L0 weight and the L1 weight to generate a predicted sample of the current block; and encoding and outputting prediction information about the current block.

In yet still another aspect of the present disclosure, there is provided a device for encoding a video, wherein the device comprises: a predicting module configured for: configuring a merge candidate list based on neighboring blocks to the current block; deriving L0 motion information and L1 motion information about the current block based on one among merge candidates included in the merge candidate list; deriving a L0 reference sample based on the L0 motion information; deriving a L1 reference sample based on the L1 motion information; deriving a L0 weight and a L1 weight for the current block; and weighted-summing the L0 reference sample and the L1 reference sample based on the L0 weight and the L1 weight to generate a predicted sample of the current block; and an entropy-encoder configured for encoding and outputting prediction information about the current block.

According to the present disclosure, inter prediction may be performed by applying weights for corresponding motion information to L0 motion information and L1 motion information for a current block, respectively. This can improve the prediction accuracy of the current block.

According to the present disclosure, a data amount of additional information for the weights for the L0 motion information and the L1 motion information of the current block may be reduced. This may improve overall coding efficiency.

BRIEF DESCRIPTION OF THE DRAWINGS

FIG. 6 shows cases when the POC difference between the current picture and the L0 reference picture and the POC difference between the current picture and the L1 reference picture are the same and different from each other respectively.

DESCRIPTION OF EXEMPLARY EMBODIMENTS

Figure 1:
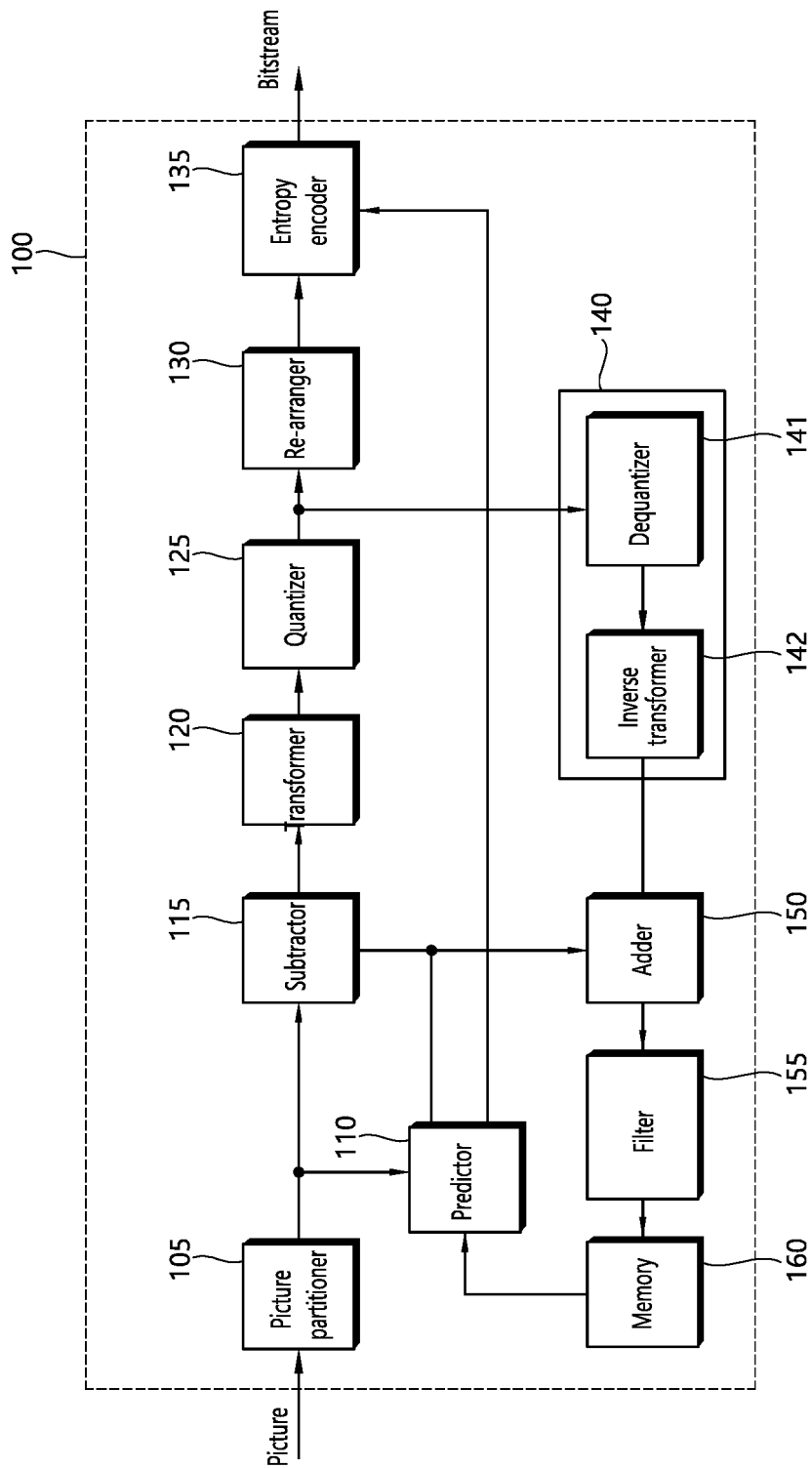
FIG. 1 is a schematic diagram illustrating a configuration of a video encoding device to which the present disclosure is applicable.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video encoding device to which the present disclosure is applicable.

Referring to FIG. 1, a video encoding device 100 may include a picture partitioner 105, a predictor 110, a subtractor 115, a transformer 120, a quantizer 125, a re-arranger 130, an entropy encoder 135, a residual processor 140, an adder 150, a filter 155, and a memory 160. The residual processor 140 may include a dequantizer 141, an inverse transformer 142, The picture partitioner 105 may split an input picture into at least one processing unit.

In one example, a processing unit may be called a coding unit (CU). In this case, starting with the largest coding unit (LCU), the coding unit may be recursively partitioned according to the QTBT (Quad-tree binary-tree) structure. For example, one coding unit may be divided into multiple coding units of a deeper depth based on a quad tree structure and/or a binary tree structure. In this case, for example, the quad tree structure may be applied first and the binary tree structure may be applied later. Alternatively, the binary tree structure may be applied first. The coding procedure according to the present disclosure may be performed based on the last coding unit which is not further divided. In this case, based on coding efficiency according to video characteristics, the largest coding unit may be used as the last coding unit. Alternatively, if necessary, the coding unit may be recursively divided into coding units of a further deeper depth so that the coding unit of the optimal size may be used as the last coding unit. In this connection, the coding procedure may include procedures such as prediction, transform, and reconstruction, which will be described later.

As another example, a processing unit may include a coding unit (CU), a prediction unit (PU) or a transform unit (TU). The coding unit is one of coding units of deeper depth split from a largest coding unit (LCU) according to a quad-tree structure. In this case, the largest coding unit may be used as a final coding unit or a coding unit may be recursively split into coding units of deeper depth as necessary and a coding unit having an optimal size may be used as a final coding unit based on coding efficiency according to video characteristics. When a smallest coding unit (SCU) is set, a coding unit cannot be split into a coding unit smaller than the smallest coding unit. Here, the final coding unit refers to a coding unit partitioned or split into a predictor or a transformer. A prediction unit is a unit partitioned from a coding unit block and may be a unit of sample prediction. Here, the prediction unit may be divided into sub blocks. A transform unit can be split from a coding unit according to the quad-tree structure and may be a unit that derives a transform coefficient and/or a unit that derives a residual signal from a transform coefficient. Hereinafter, the coding unit may be called a coding block (CB), the prediction unit may be called a predicted block (PB), and the transform unit may be called a transform block (TB). The predicted block or the prediction unit may mean a specific area having a block shape in a picture, and may include an array of a predicted sample. Further, the transform block or the transform unit may mean a specific area having a block shape in a picture, and may include a transform coefficient or an array of a residual sample.

The predicter 110 may perform prediction on a processing target block (hereinafter, a current block), and may generate a predicted block including predicted samples for the current block. A unit of prediction performed in the predicter 110 may be a coding block, or may be a transform block, or may be a predicted block.

The predicter 110 may determine whether intra-prediction is applied or inter-prediction is applied to the current block. For example, the predicter 110 may determine whether the intra-prediction or the inter-prediction is applied in unit of CU.

In case of the intra-prediction, the predicter 110 may derive a predicted sample for the current block based on a reference sample outside the current block in a picture to which the current block belongs (hereinafter, a current picture). In this case, the predicter 110 may derive the predicted sample based on an average or interpolation of neighboring reference samples of the current block (case (i)), or may derive the predicted sample based on a reference sample existing in a specific (prediction) direction as to a predicted sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predicter 110 may determine the prediction mode to be applied to the current block by using the prediction mode applied to the neighboring block.

In case of the inter-prediction, the predicter 110 may derive the predicted sample for the current block based on a sample specified by a motion vector on a reference picture. The predicter 110 may derive the predicted sample for the current block by applying any one of a skip mode, a merge mode, and a motion vector prediction (MVP) mode. In case of the skip mode and the merge mode, the predicter 110 may use motion information of the neighboring block as motion information of the current block. In case of the skip mode, unlike in the merge mode, a difference (residual) between the predicted sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and can be discriminated from a coding order.

The subtractor 115 generates a residual sample which is a difference between an original sample and a predicted sample. If the skip mode is applied, the residual sample may not be generated as described above.

The transformer 120 transforms residual samples in units of a transform block to generate a transform coefficient. The transformer 120 may perform transformation based on the size of a corresponding transform block and a prediction mode applied to a coding block or predicted block spatially overlapping with the transform block. For example, residual samples can be transformed using discrete sine transform (DST) if intra-prediction is applied to the coding block or the predicted block overlapping with the transform block and the transform block is a 4×4 residual array and is transformed using discrete cosine transform (DCT) in other cases.

The quantizer 125 may quantize the transform coefficients to generate a quantized transform coefficient.

The re-arranger 130 rearranges quantized transform coefficients. The re-arranger 130 may rearrange the quantized transform coefficients in the form of a block into a one-dimensional vector through a coefficient scanning method. Although the re-arranger 130 is described as a separate component, the re-arranger 130 may be a part of the quantizer 125.

The entropy encoder 135 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 135 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer 141 dequantizes values (transform coefficients) quantized by the quantizer 125 and the inverse transformer 142 inversely transforms values dequantized by the dequantizer 141 to generate a residual sample.

The adder 150 adds a residual sample to a predicted sample to reconstruct a picture. The residual sample may be added to the predicted sample in units of a block to generate a reconstructed block. Although the adder 150 is described as a separate component, the adder 150 may be a part of the predicter 110. The adder 150 may be referred to as a reconstruction unit or reconstructed block generator.

The filter 155 may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter 155 may apply an adaptive loop filter (ALF) to the reconstructed picture. The ALF may be applied to the reconstructed picture to which deblocking filtering and/or sample adaptive offset has been applied.

The memory 160 may store a reconstructed picture (decoded picture) or information necessary for encoding/decoding. Here, the reconstructed picture may be the reconstructed picture filtered by the filter 155. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
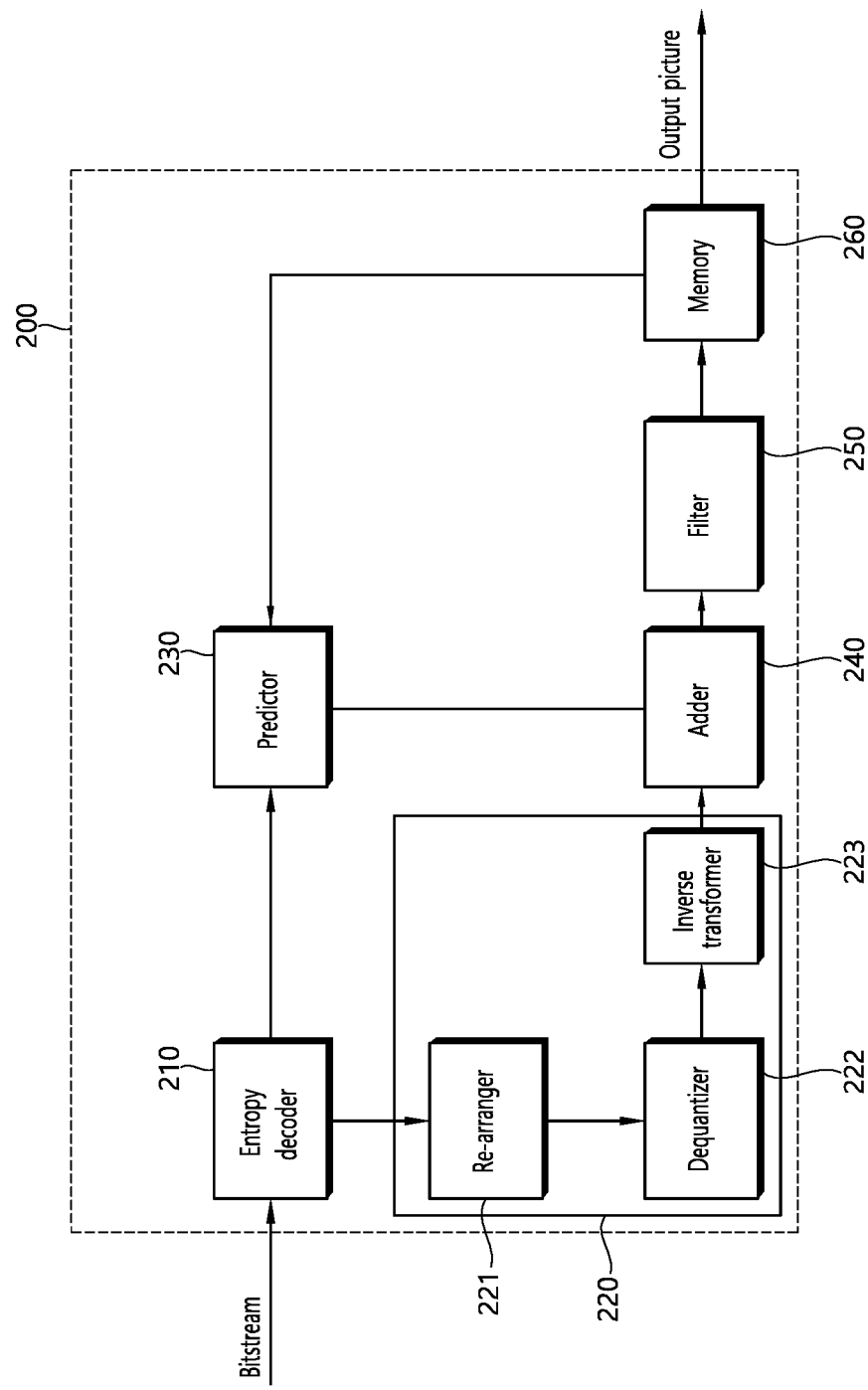
FIG. 2 is a schematic diagram illustrating a configuration of a video decoding device to which the present disclosure is applicable.

FIG. 2 briefly illustrates a structure of a video decoding device to which the present disclosure is applicable.

Referring to FIG. 2, a video decoding device 200 may include an entropy decoder 210, a residual processor 220, a predictor 230, an adder 240, a filter 250 and a memory 260. The residual processor may include a re-arranger 221, a dequantizer 222, and an inverse transformer 223.

When a bitstream including video information is input, the video decoding device 200 may reconstruct a video in association with a process by which video information is processed in the video encoding device.

For example, the video decoding device 200 may perform video decoding by using a processing unit applied in the video encoding device. Therefore, as an example, the processing unit block of video decoding may be a coding unit, or as another example, the processing unit block of video decoding may be a coding unit, a prediction unit, or a transform unit. The coding unit may be split according to a quad tree structure or binary tree structure from a largest coding unit block.

A prediction unit or a transform unit may be used, here the prediction unit block is a block derived or partitioned from the coding unit, the prediction unit may be a unit block of sample prediction. In this case, the prediction unit may be divided into sub blocks. The transform unit may be split according to the quad tree structure, and may be a unit for deriving a transform coefficient or a unit for deriving a residual signal from the transform coefficient.

The entropy decoder 210 may parse the bitstream to output information required for video reconstruction or picture reconstruction. For example, the entropy decoder 210 may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method can receive a bin corresponding to each syntax element in a bitstream, determine a context model using decoding target syntax element information and decoding information of neighboring and decoding target blocks or information of amabol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 221.

The re-arranger 221 may rearrange the quantized transform coefficients into a two-dimensional block form. The re-arranger 221 may perform rearrangement corresponding to coefficient scanning performed by the encoding device. Although the re-arranger 221 is described as a separate component, the re-arranger 221 may be a part of the dequantizer 222.

The dequantizer 222 may de-quantize the quantized transform coefficients based on a (de)quantization parameter to output a transform coefficient. In this case, information for deriving a quantization parameter may be signaled from the encoding device.

The inverse transformer 223 may inverse-transform the transform coefficients to derive residual samples.

The predictor 230 may perform prediction on a current block, and may generate a predicted block including predicted samples for the current block. A unit of prediction performed in the predictor 230 may be a coding block or may be a transform block or may be a predicted block.

The predictor 230 may determine whether to apply intra-prediction or inter-prediction based on information on a prediction. In this case, a unit for determining which one will be used between the intra-prediction and the inter-prediction may be different from a unit for generating a predicted sample. In addition, a unit for generating the predicted sample may also be different in the inter-prediction and the intra-prediction. For example, which one will be applied between the inter-prediction and the intra-prediction may be determined in unit of CU. Further, for example, in the inter-prediction, the predicted sample may be generated by determining the prediction mode in unit of PU, and in the intra-prediction, the predicted sample may be generated in unit of TU by determining the prediction mode in unit of PU.

In case of the intra-prediction, the predictor 230 may derive a predicted sample for a current block based on a neighboring reference sample in a current picture. The predictor 230 may derive the predicted sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 250 may derive a predicted sample for a current block based on a sample specified in a reference picture according to a motion vector. The predictor 230 may derive the predicted sample for the current block using one of the skip mode, the merge mode and the MVP mode. Here, motion information required for inter-prediction of the current block provided by the video encoding device, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 230 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a predicted sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 250 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 230 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD can be obtained by subtracting the motion vector predictor from the motion vector of the current block. Here, the predictor 230 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 240 can add a residual sample to a predicted sample to reconstruct a current block or a current picture. The adder 240 may reconstruct the current picture by adding the residual sample to the predicted sample in units of a block. When the skip mode is applied, a residual is not transmitted and thus the predicted sample may become a reconstructed sample. Although the adder 240 is described as a separate component, the adder 240 may be a part of the predictor 230. The adder 240 may be referred to as a reconstruction unit or reconstructed block generator.

The filter 250 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 260 may store a reconstructed picture or information necessary for decoding. Here, the reconstructed picture may be the reconstructed picture filtered by the filter 250. For example, the memory 260 may store pictures used for inter-prediction. Here, the pictures used for inter-prediction may be designated according to a reference picture set or a reference picture list. A reconstructed picture may be used as a reference picture for other pictures. The memory 260 may output reconstructed pictures in an output order.

When inter prediction is performed on the current block as described above, motion information for the inter prediction may be derived. The motion information may include L0 motion information in the L0 direction and L1 motion information in the L1 direction. In this connection, the L0 motion information may include a L0 reference picture index and motion vector L0 (Motion Vector L0, MVL0) indicating the L0 reference picture included in the reference picture list L0 (List 0, L0) for the current block. The L1 motion information may include an L1 reference picture index and MVL1 indicating an L1 reference picture included in a reference picture list L0 (List 1, L1) for the current block. In this connection, the L0 direction may be called the previous direction or the forward direction. Further, the L1 direction may be referred to as a subsequent direction or an inverse direction. Further, the reference picture list L0 may include previous pictures to the current picture in the output order. The reference picture list L1 may contain subsequent pictures to the current picture in the output order.

When performing inter prediction based on the L0 motion information in prediction of the current block, this may be referred to as L0 prediction. When performing inter prediction based on L1 motion information, this may be referred to as L1 prediction. When performing inter prediction based on the L0 motion information and L1 motion information, this may be called bi-prediction. According to the present disclosure, it is proposed a method to derive a predicted sample of the current block via weighted-summing between the L0 reference sample derived based on the L0 motion information and the L1 reference sample derived based on the L1 motion information when inter prediction is performed on the current block, in particular, when the bi-prediction is performed on the current block. The method of deriving a predicted sample via the weighted-summing may improve the prediction accuracy of the bi-prediction. This may improve overall coding efficiency.

Figure 3:
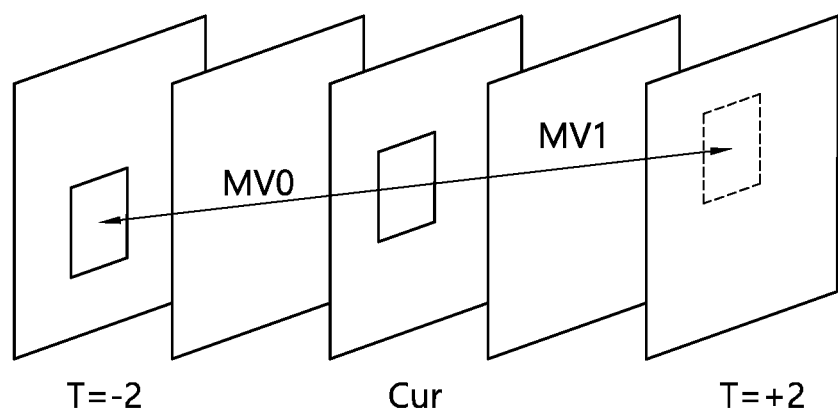
FIG. 3 shows the L0 reference picture and the L1 reference picture for the inter prediction of the current block and MVL0 and MVL1.

FIG. 3 shows the L0 reference picture and the L1 reference picture for the inter prediction of the current block and MVL0 and MVL1. When inter prediction is performed on the current block, in particular, when bi-prediction is performed on the current block, the decoding device may derive the L0 reference block based on the L0 motion information, and may derive the L1 reference block based on the L1 motion information. In this case, the decoding device may sum the L0 reference sample of the L0 reference block and the L1 reference sample of the L1 reference block corresponding to the L0 reference sample using the same weight applied thereto, thereby generating a predicted sample of the current block. That is, the decoding device may derive the L0 reference sample based on the L0 motion information. The decoding device may derive the L1 reference sample based on the L1 motion information. Then, the decoding device may generate the predicted sample as ½ of the sum value between the sample value of the L0 reference sample and the sample value of the L1 reference sample. This may correspond to a case where the weight of each of the L0 reference sample and the L1 reference sample is ½. In this case, the predicted block containing the predicted sample may be derived based on a following Equation:

$$Block_{pred}(i,j)=(Block_{cor0}(i,j)+Block_{cor1}(i,j))/2 \quad [\text{Equation 1}]$$

In this connection, i, j represents a position (i, j) of the sample in the block. $Block_{pred}$ represents the predicted block for the current block, $Block_{cor0}$ represents the L0 reference block indicated by the MVL0, and $Block_{cor1}$ represents the L1 reference block indicated by the MVL1.

In one example, the decoding device may generate the predicted sample with considering the weight for each of L0 direction and L1 direction. The method of generating the predicted sample with considering the weight for each of the L0 direction and the L1 direction may improve the prediction accuracy as compared to the bi-prediction method shown in Equation 1. Specifically, the decoding device may derive the L0 reference sample based on the L0 motion information. The device may derive the L1 reference sample based on the L1 motion information. Then, the device may generate the predicted sample by summing the value obtained by multiplying the sample value of the L0 reference sample by L0 weight and the value obtained by multiplying the sample value of the L1 reference sample by L1 weight. A predicted block containing the predicted sample may be derived based on a following equation:

$$Block_{pred}(i,j) = w \times Block_{cor0}(i,j) + (1-w) \times Block_{cor1}(i,j),$$
$$0 < w < 1$$
[Equation 2]

In this connection, i, j represents a position (i, j) of the sample in the block. $Block_{pred}$ represents the predicted block for the current block, $Block_{cor0}$ represents the L0 reference block indicated by the MVL0, and $Block_{cor1}$ represents the L1 reference block indicated by the MVL1. w represents the L0 weight. In this case, the L1 weight may be expressed as a value obtained by subtracting the L0 weight from 1, that is, expressed as (1−w).

When motion information is directly encoded and signaled to the current block as in the AMVP mode, the L0 weight and the L1 weight may be obtained from the directly encoded information on L0 weight and the L1 weight. When as in the merge mode, motion information of neighboring blocks to the current block is indexed and signaled to the current block, the the L0 weight and the L1 weight may be obtained using various methods as follows.

Figure 4:
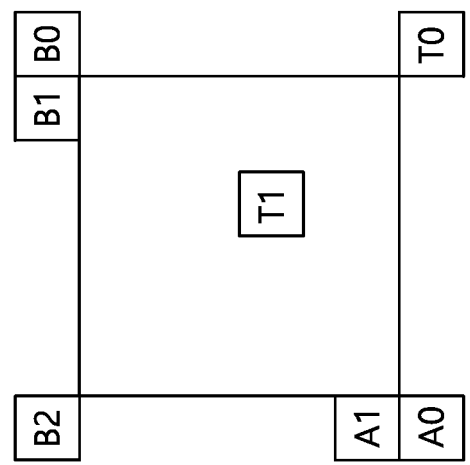
FIG. 4 shows one example of configuring a merge candidate list for the motion information derivation when the merge mode is applied to the current block.

FIG. 4 shows one example of configuring the merge candidate list for motion information derivation when the merge mode is applied to the current block. Referring to FIG. 4, the decoding device may derive a merge candidate list for motion information derivation of the current block based on neighboring blocks to the current block. The merge candidate list may be configured to include the motion information of neighboring blocks adjacent to the current block as a merge candidate. The neighboring block adjacent to the current block spatially may be called a spatial neighboring block. The spatial neighboring blocks may include a lower-left neighboring block A0, a left neighboring block A1, an upper-right neighboring block B0, an upper neighboring block B1, and/or an upper-left neighboring block B2 of the current block. Further, the merge candidate list may be configured to include motion information of a temporal neighboring block (for example, temporal neighboring block T0 or temporal neighboring block T1 shown in FIG. 4) adjacent to the current block temporally as a merge candidate. In this connection, the reference picture containing the temporal neighboring block may be called a collocated picture (colPic). The temporal neighboring block may include a lower-left neighboring block T0 or a central lower-left block T1 of the collocated block in the collocated picture. Further, the merge candidate list may be configured to include a zero vector or a combined bi-predicted candidate derived by combining the motion information of the neighboring blocks as a merge candidate. The merge candidate list may be configured to include motion information of the spatial neighboring block to the current block, motion information of the temporal neighboring block thereto and/ or the combined bi-prediction candidates derived by combining motion information of the neighboring blocks. One of the merge candidates included in the merge candidate list may be selected and used as the motion information of the current block.

In one example, the motion information of neighboring blocks to the current block as shown in FIG. 4, that is, A0, A1, B0, B1, B2, T0, T1, and the combined candidates as included as a merge candidate of the merge candidate list may be motion information encoded based on the AMVP mode. In this case, the motion information may include L0 weight and L1 weight for each motion information. If the L0 weight and the L1 weight are stored on a block basis, the L0 weight and L1 weight for the current block may be derived based on the L0 weight and L1 weight for each motion information.

Figure 5:
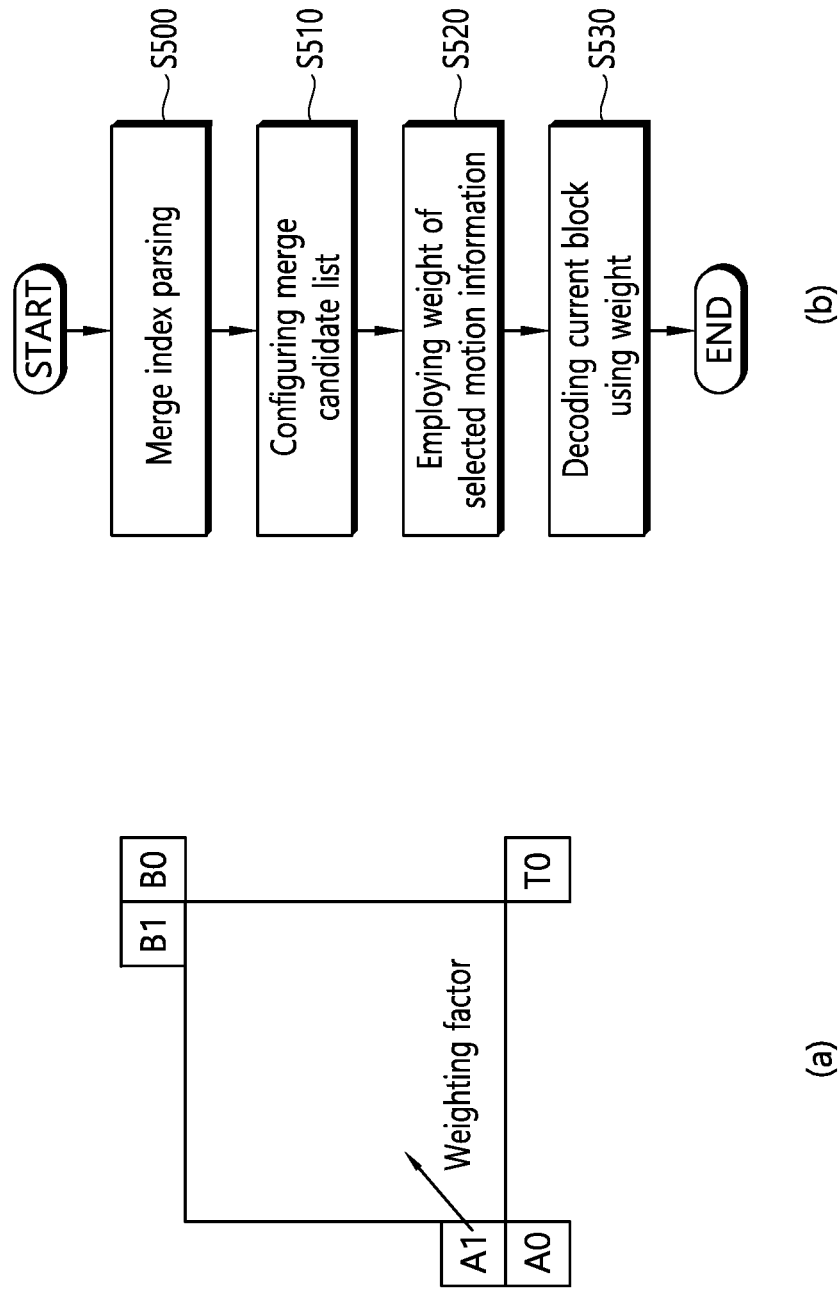
FIG. 5 shows one example of deriving the L0 weight and the L1 weight from the merge candidate included in the merge candidate list.

FIG. 5 shows one example of deriving the L0 weight and the L1 weight from the merge candidate included in the merge candidate list. When one of the merge candidates contained in the merge candidate list is selected for motion information of the current block, the L0 weight and L1 weight used in the prediction of the neighboring block associated with the selected merge candidate may be derived as L0 weight and L1 weight of the current block, respectively. For example, when the A1 is selected among the merge candidates included in the merge candidate list, the L0 weight and L1 weight used in the prediction of the neighboring block at the A1 location, that is, the left neighboring block to the current block may be derived as L0 weight and L1 weight for the current block, respectively. Specifically, when the value of the L0 weight used in the prediction of the left neighboring block is ⅜ and the value of the L1 weight is ⅝, the value of the L0 weight for the current block is ⅜, and the value of L1 weight is ⅝.

in FIG. 5, (b) shows the process of decoding the current block using the weights when the merge mode is applied to the current block. The decoding device may parse the merge index for the current block (S500). The merge index may be signaled over a bitstream. The decoding device may configure a merge candidate list (S510). The decoding device may derive the merge candidate list that contains the motion information of the neighboring blocks to the current block as merge candidates as described above. The decoding device may employ, as weights for the current block, weights of the selected motion information as the merge candidate selected among the merge candidates included in the merge candidate list (S520). The selected merge candidate may represent a merge candidate indicated by the merge index. The decoding device may apply the weights of the motion information of the selected merge candidate, that is, the motion information of the selected neighboring block as the weights for the current block.

Further, in another example, the decoding device may derive a value most selected for the prediction of each merge candidate block among the merge candidates, more specifically, the weights of the merge candidates, as the weight for the current block. In other words, the decoding device may derive the most-frequently-used value among the values of the weights of the merge candidates as the weight for the current block. Specifically, the decoding device may derive the most-frequently-used value among the values of L0 weights of the merge candidates included in the merge candidate list. The most-frequently-used value of the values among the L0 weights of the merge candidates may be derived as the L0 weight for the current block. Further, the decoding device may derive the most-frequently-used value among the values of the L1 weights of the merge candidates included in the merge candidate list. The most-frequently-used value among the L1 weights of the merge candidates may be derived as the L1 weight for the current block.

Further, in another example, the decoding device may apply the average value of the weight values of the motion information (merge candidates) of the neighboring blocks to the current block as the weight for the current block. Specifically, for example, the decoding device may derive the average value of L0 weights of the merge candidates included in the merge candidate list. The average value of the L0 weights of the merge candidates may be derived as the L0 weight for the current block. Further, the decoding device may derive the average value of the L1 weights of the merge candidates included in the merge candidate list. The average value of the L1 weights of the merge candidates may be derived as the L1 weight for the current block.

Further, in another example, the decoding device may apply the median value of the weight values of the motion information (merge candidates) of the neighboring blocks to the current block as the weight for the current block. Specifically, for example, a decoding device may derive an median value of L0 weights of merge candidates included in the merge candidate list. The median value of the L0 weights of the merge candidates may be derived as the L0 weight for the current block. Further, the decoding device may derive an median value of the L1 weights of the merge candidates included in the merge candidate list. The median value of the L1 weights of the merge candidates may be derived as the L1 weight for the current block.

In one example, weights for the current block may be derived based on the motion information of the neighboring block to the current block as described above. Alternatively, information about the weights for the current block may be sent directly. Based on the information, weights for the current block may be derived.

Specifically, when the merge mode is applied to the current block, the bi-prediction may be performed based on the motion information of the selected neighboring block to the current block among the merge candidates of the merge candidate list. In this case, the weights may be derived using a cost function using the L0 reference block and the L1 reference block derived from the motion information. The cost function to derive the L0 weight and the L1 weight may be expressed as Equation as follows:

$$Cost_{distortion} = \sum_{(i,j) \in BlockSize} |Block_{cur}(i, j) - \text{[Equation 3]}$$

$$(w \times Block_{ref0}(i, j) + (1 - w) \times Block_{ref1}(i, j))|$$

In this connection, i, j represents a position (i, j) of the sample in the block. $Cost_{distortion}$ represents a cost. $Block_{ref0}$ represents the sample value of the L0 reference block indicated by MVL0 in the L0 direction. $Block_{ref1}$ represents the sample value of the L1 reference block indicated by the MVL1 in the L1 direction. w represents the L0 weight. In this case, the L1 weight may be expressed as a value obtained by subtracting the L0 weight from 1, that is, expressed as (1−w). The cost may represent the difference between the samples corresponding to the L0 reference block and the L1 reference block. As shown in Equation 3, the cost may be derived as the sum of the absolute values of the differences between the samples corresponding to the L0 reference block to which the L0 weight is applied and the L1 reference block to which the L1 weight is applied, respectively.

The cost may be used to derive the weights for the bi-prediction. For example, an encoding device may apply a plurality of L0 weight candidate and L1 weight candidate combinations to the L0 reference block and the L1 reference block to derive a plurality of costs. An index indicating a L0 weight candidate and L1 weight candidate combination with respect to the minimum cost among the plurality of costs may be signaled. The decoding device may parse the index. The L0 weight candidate and L1 weight candidate in the L0 weight candidate and L1 weight candidate combination as indicated by the index may be derived as the L0 weight and the L1 weight, respectively. In this connection, the index may be called a bi-prediction weight index or a weight index. In one example, only distortion is considered in Equation 3, but in the course of deriving the weights, a rate may be included such that rate-distortion optimization (RDO) may be performed.

The weight index may be sent on a prediction unit (PU) or coding unit (CU) basis. The prediction unit may be called a prediction block. The coding unit may be called a coding block. When the weight index is transmitted on a CU basis, the same weight may be applied to PUs corresponding to one CU.

In one example, when the weight index is sent on a CU basis, the syntax may be configured as shown in a following table:

TABLE 1

| | Descriptor |
|---|---|
| coding_unit( x0, y0, log2CbSize ) { | |
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   nCbS = ( 1 << log2CbSize ) | |
|   if( cu_skip_flag[ x0 ][ y0 ] ) | |
|     bi_pred_weighting_idx[ x0 ][ y0 ] | ae(v) |
|     prediction_unit( x0, y0, nCbS, nCbS ) | |
|   else { | |
|     if( slice_type != I ) | |
|       pred_mode_flag | ae(v) |
|     if( CuPredMode[ x0 ][ y0 ] != MODE_INTRA \|\| log2CbSize = = MinCbLog2SizeY ) | |
|       part_mode | ae(v) |
|     if( CuPredMode[ x0 ][ y0 ] = = MODE_INTRA ) { | |
|       ... | |
|     } else { | |
|       bi_pred_weighting_idx [ x0 ][ y0 ] | ae(v) |
|       if( PartMode = = PART_2Nx2N ) | |
|         prediction_unit( x0, y0, nCbS, nCbS) | |
|       else if( PartMode = = PART_2NxN ) { | |
|         prediction_unit( x0, y0. nCbS, nCbS/2 ) | |
|         ... | |

In this connection, cu_skip_flag indicates a syntax element (skip flag) indicating whether skip mode of the CU is applied or not. part_mode represents a syntax element indicating information about partitioning of the CU into Pus. bi_pred_weighting_idx represents a syntax element of the weight index indicating one of L0 weight candidate and L1 weight candidate combinations. Table 1 shows that both when the skip mode is applied to the CU and when the skip mode is not applied, the weight index is signaled. However, whether or not to signal the weight index may be individually determined between the case when the skip mode is applied to the CU and when skip mode is not applied. When the weight index is coded on the CU basis and transmitted, the weight index may be signaled at a lower frequency than in an approach in which the weight index is encoded to be parsed before the part_mode is parsed and the weight index is transmitted on the PU basis.

However, even when the merge mode is not applied, the weight index may be signaled. Thus, in this case, the bit rate may be increased than when the weight index is transmitted on the PU basis. For example, when the weight index is sent on a PU basis, the syntax may be configured as shown in a following table:

TABLE 2

| prediction_unit( x0, y0, nPbW, nPbH ) { | Descriptor |
|---|---|
| if( cu_skip_flag[ x0 ][ y0 ] ) { | |
| if( MaxNumMergeCand > 1 ) | |
| merge_idx[ x0 ][ y0 ] | ae(v) |
| } else { /* MODE_INTER */ | |
| merge_flag[ x0 ][ y0 ] | ae(v) |
| if( merge_flag[ x0 ][ y0 ] ) { | |
| if( MaxNumMergeCand > 1 ) | |
| merge_idx[ x0 ][ y0 ] | ae(v) |
| bi_pred_weighting_idx[ x0 ][ y0 ] | ae(v) |
| }else { | |
| ... | |
| } | |
| } | |
| } | |

In this connection, merge_flag indicates a syntax element of a merge_flag indicating whether to apply the merge mode of the PU. merge_idx represents the syntax element of the merge index. bi_pred_weighting_idx represents the weight index. When the weight index is transmitted on a PU basis, The weight index is parsed and transmitted after the merge index. In this case, the weight index may be signaled only when the merge mode is applied to the PU. This may prevent unintended bit rate increase. That is, the weight index may be signaled only when the value of the merge flag is 1. However, in this case, the weight index may be transmitted at a higher frequency than a method of transmitting the weight index on the CU basis as described above.

In one example, the method of binarizing the weight index may include a method of fixedly matching the weight index and a binary code, and a method of variably matching the weight index and a binary code. One example of the method of binarizing the weight index by fixedly mapping the weight index to the binning code may be as shown in a following table.

TABLE 31

| 가중치 인덱스 | 가중치 값 (L0, L1) | Binary code |
|---|---|---|
| 0 | 1/8, 7/8 | 111110 |
| 1 | 2/8, 6/8 | 1110 |
| 2 | 3/8, 5/8 | 10 |

TABLE 31-continued

| 가중치 인덱스 | 가중치 값 (L0, L1) | Binary code |
|---|---|---|
| 3 | 1/2, 1/2 | 0 |
| 4 | 5/8, 3/8 | 110 |
| 5 | 6/8, 2/8 | 11110 |
| 6 | 7/8, 1/8 | 111111 |

The number of L0 weight candidate and L1 weight candidate combinations may be assumed to be 7. In this case, the value of the L0 weight candidate and L1 weight candidate combination indicated by the value of the weight index may be derived as shown in a second column of Table 3. Further, the binary code corresponding to the value of the weight index may be derived as shown in a third column of Table 3. The number of bits allocated for the weight index may be variable depending on the value of the weight index. A small number of bits may be allocated when the selected frequency has a high value. For example, the L0 weight candidate and the L1 weight candidate combination having a value of (½, ½) may have the highest selected frequency at which the combination is selected for prediction of each block. In this case, a coding gain may be obtained by assigning a binary code of a low bit to the value of the weight index indicating the combination. Further, all values of the weight index may be mapped to 3-bits binary codes. That is, the number of bits of the weight index may be fixed to 3. The 3-bits binary code may include 000, 001, 010, 011, 100, 101 and 110.

In one example, the value of the weight index may be fixedly associated with the binary code. Alternatively, they may be variably matched each other. For example, the value of the weight index may be predicted. In other words, a L0 weight predictor and a L1 weight predictor may be predicted based on at least one of the merge candidates (or motion information of neighboring blocks to the current block). Thus, index values corresponding to the L0 weight predictor and the L1 weight predictor may be derived. For example, the L0 weight and L1 weight of the merge candidate selected based on the merge index may be derived as the L0 weight predictor and the L1 weight predictor, respectively.

The weight index may represent the difference value between the index value corresponding to the L0 weight predictor and the L1 weight predictor among the index values for the combinations and an actual weight index value thereof. That is, the binary code may be assigned based on the difference value and the value of the weight index. A binary code representing the weight index may has a variable length bit based on the difference value. The binary code corresponding to the difference value may be as shown in a following table:

TABLE 4

| Difference value of weight index | Binary code |
|---|---|
| −3 | 111110 |
| −2 | 1110 |
| −1 | 10 |
| 0 | 0 |
| 1 | 110 |
| 2 | 11110 |
| 3 | 111111 |

The difference value may be expressed as a value obtained by subtracting the index value corresponding to the L0 weight predictor and the L1 weight predictor from the value of the actual weight index. Specifically, for example, the weight index value predicted based on a trend of the weights of the neighboring blocks may be 2 indicating the combination (3/8, 5/8). The value of the derived actual weight index is 4 indicating a combination of (5/8, 3/8). The difference value may be expressed as 2=4−2. Thus, the binary code of the actual derived weight index may be derived as 11110. Further, the weight index value predicted based on a trend of the weights of the neighboring blocks may be 5 indicating the combination (6/8, 2/8). The value of the derived actual weight index is 3 indicating a combination of (1/2, 1/2). The difference value may be expressed as −2=3−5. Thus, the binary code of the actual derived weight index may be derived as 1110. In this connection, a combination (x, y) may represent a combination of L0 weight candidate and L1 weight candidate where the value of the L0 weight candidate is x and the value of the L1 weight candidate is y.

In the method of mapping a variable binary code to the value of the weight index as described above, the difference value needs to be transmitted. Thus, the number of cases in which the value is to be encoded increases by a factor of 2, so that there may be a problem that the binary code becomes longer. Therefore, as shown in Table 4, the number of cases for the difference value may be limited to seven.

In one example, there may be a method of calculating the L0 weight and the L1 weight without receiving information about the weights. In one example, the weights may be derived based on the ratio of the POC difference between the current picture and the L0 reference picture and the POC difference between the current picture and the L1 reference picture.

FIG. 6 shows cases in which the POC difference between the current picture and the L0 reference picture and the POC difference between the current picture and the L1 reference picture are the same and different from each other. The L0 weight and the L1 weight may be derived such that the ratio between the L0 weight and the L1 weight is inversely proportional to the ratio between the POC difference between the L0 reference picture and the current picture and the POC difference between the L1 reference picture and the current picture. For example, the POC difference between the L0 reference picture and the current picture and the POC difference between the L1 reference picture and the current picture may be the same, as shown in (a) of FIG. 6. In this case, the L0 weight and the L1 weight may be equally derived as 1/2.

Further, as shown in (b) of FIG. 6, the POC difference between the L0 reference picture and the current picture may be 2. The POC difference between the L1 reference picture and the current picture may be 1. In this case, the ratio between the POC difference between the L0 reference picture and the current picture and the POC difference between the L1 reference picture and the current picture may be derived as 2:1. Therefore, the L0 weight may be derived as 1/3 and the L1 weight as 2/3 such that the ratio between the L0 weight and the L1 weight is inversely proportional to the ratio of 2:1. In one example, the POC difference between pictures may be called a temporal spacing. The POC difference between the L0 reference picture and the current picture may be referred to as a first temporal spacing. The POC difference between the L1 reference picture and the current picture may be referred to as a second temporal spacing.

As another example of a method for calculating the L0 weight and the L1 weight without receiving information about the weights, there may be a method to derive the L0 weight and the L1 weight based on the templates of the current block and templates of the reference block. In this connection, the template for the current block may be a specific region containing left neighboring samples and the upper neighboring samples to the current block. The template of the reference block may be a specific region including left neighboring samples and the upper neighboring samples to the reference block.

Figure 7:
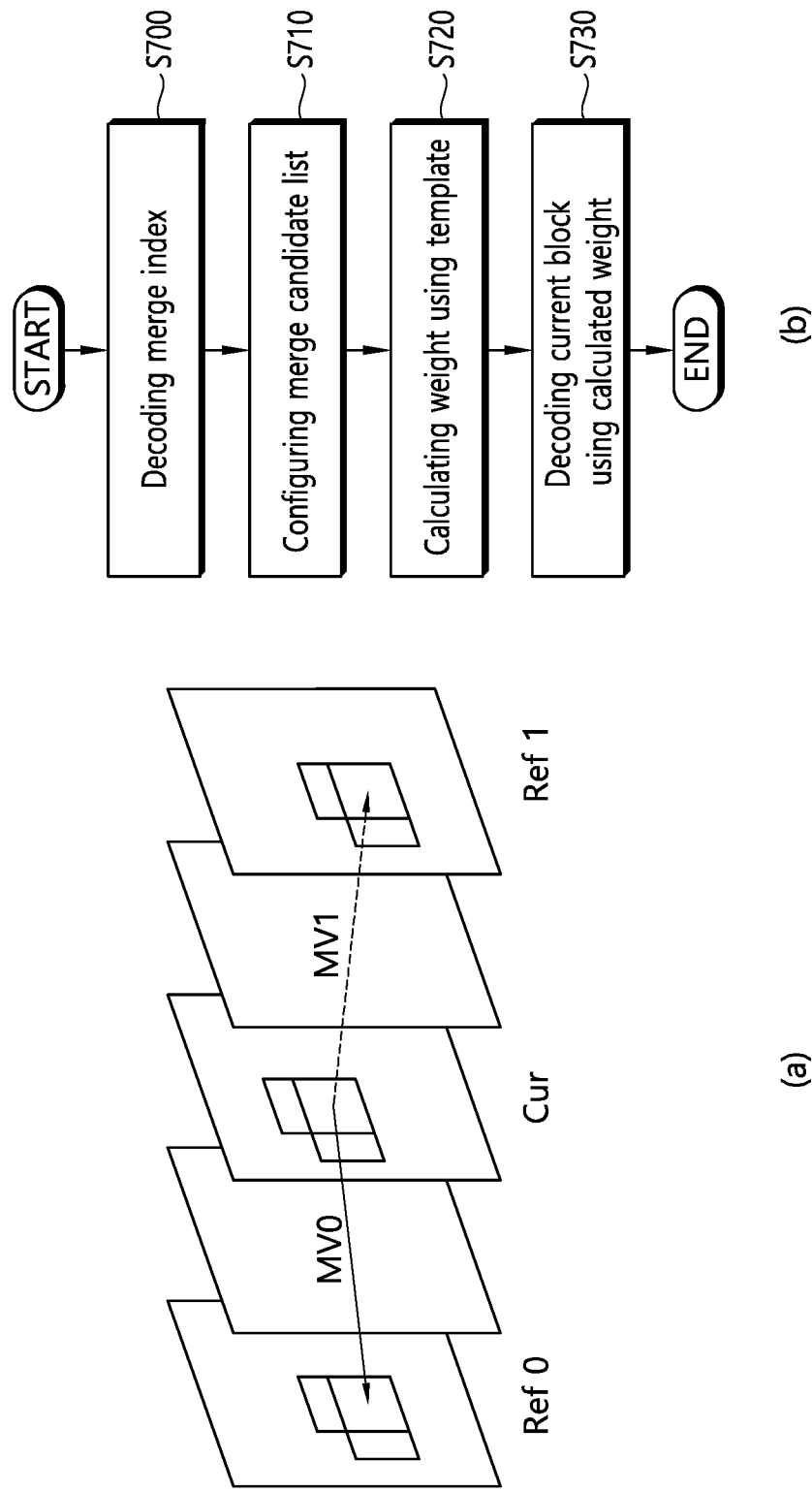
FIG. 7 shows an example of deriving the L0 weight and the L1 weight of the current block based on the templates of the current block and the templates of the reference blocks.

FIG. 7 shows an example of a method for deriving the L0 weight and the L1 weight for the current block based on templates of the current block and reference blocks. FIG. 7 (a) shows the template for the current block and the template for the L0 reference block and the template for the L1 reference block corresponding to the template for the current block. The template for the L0 reference block may be called the L0 template. The template of the L1 reference block may be called an L1 template. The decoding device may derive the L0 weight and L1 weight for the current block based on the template for the current block, the L0 template and the L1 template.

FIG. 7 (b) shows one example of a method for deriving the L0 weight and L1 weight for the current block. The decoding device may parse the merge index (S700). The merge index may be signaled over a bitstream. The decoding device may configure a merge candidate list (S710). The decoding device may derive the merge candidate list that contains the motion information of the neighboring blocks to the current block as merge candidates as described above. The decoding device may derive motion information about the current block based on the merge candidate indicated by the merge index among the merge candidates included in the merge candidate list. The decoding device may derive the L0 reference block and the L1 reference block for the current block based on the motion information. In this case, the decoding device may derive the template for the current block and the L0 template and L1 template corresponding to the template for the current block. The template for the current block may contain left neighboring samples and upper neighboring samples to the current block. That is, the template for the current block may be a specific region including left neighboring samples and the upper neighboring samples to the current block. The L0 template may include left neighboring samples and upper neighboring samples to the L0 reference block. The L1 template may include left neighboring samples and upper neighboring samples to the L1 reference block. The L0 template may be a specific region including left neighboring samples and the upper neighboring samples to the L0 reference block. The L1 template may be a specific region including left neighboring samples and the upper neighboring samples to the L1 reference block.

The decoding device may calculate L0 weight and L1 weight for the current block based on the template for the current block, the L0 template and the L1 template (S720). The corresponding samples to the L0 template and the L1 template may be weighted-summed. The difference between the sample value of the template for the current block and the weighted-summed value, that is, a cost, may be used to derive the weights for the bi-prediction. For example, multiple L0 weight candidate and L1 weight candidate combinations may be applied to the L0 template and the L1 template to yield multiple weighted-summed templates. Each of multiple costs between the multiple weighted-summed templates for the reference blocks and the template for the current block may be deduced. The L0 weight candidate and the L1 weight candidate for the minimum cost of the multiple costs may be derived as the L0 weight and the L1 weight for the current block, respectively. The cost function to derive the L0 weight and the L1 weight may be expressed as Equation as follows. That is, the cost may be derived based on Equation as follows:

$$Cost_{distortion} = \sum_{(i,j) \in TemplateSize} |Temp_{cur}(i, j) - (w \times Temp_{ref0}(i, j) + (1 - w) \times Temp_{ref1}(i, j))| \quad \text{[Equation 4]}$$

where i, j represents a position (i, j) of the sample in the block. $Cost_{distortion}$ represents a cost. $Temp_{cur}$ represents the sample value of the template for the current block. $Temp_{ref0}$ represents the sample value of the L0 template. $Temp_{ref1}$ represents the sample value of the L1 template. w represents the L0 weight. In this case, the L1 weight may be expressed as a value obtained by subtracting the L0 weight from 1, that is, expressed as (1−w). The decoding device may derive the weights for the bi-prediction based on the Equation 4.

The decoding device may decode the current block based on the calculated weights (S730). The decoding device may generate a predicted block for the current block by weighted-summing the L0 reference block and the L1 reference block for the current block based on the L0 weight and L1 weight. The decoding device may use the predicted block as a reconstructed block or may add a residual to the predicted block to create a reconstructed block, according to the prediction mode type.

In one example, the weights may be derived using a combination of the above methods. Specifically, the method using the motion information of the neighboring block to the current block, that is, the merge candidate weight indicated by the merge index as the weight for the current block, and the method of deriving the weight based on the POC difference may be selectively applied case-by-case. The method for deriving the weight based on the POC difference and a method for deriving the weight based on templates for the current block and reference block may be selectively applied case-by-case.

In one example, when the reference pictures for bi-prediction are at the same temporal spacing. That is, when the first temporal spacing between the current picture and the L0 reference picture and the second temporal spacing between the current picture and the L1 reference picture are the same, each of the L0 weight and L1 weight may be derived as ½. When the reference pictures are at different temporal spacings, that is, when the first temporal spacing and the second temporal spacing are different, the L0 weight and L1 weight may be derived based on the template of the current block and the template of the reference blocks as described above.

In another example, when the merge mode is applied to the current block and when the motion information of the spatial neighboring blocks among the merge candidates included in the merge candidate list is selected as motion information on the current block, the weight of the motion information of the selected spatial neighboring block may be applied as the weight for the current block. When a merge candidate derived as motion information of the temporal neighboring blocks among the merge candidates or as the combination of the motion information is selected as motion information about the current block, the weight for the current block may be derived as ½.

In another example, when the merge mode is applied to the current block and when the motion information of the spatial neighboring block among the merge candidates included in the merge candidate list is selected as motion information on the current block, the weight of the motion information of the selected spatial neighboring block may be applied as the weight for the current block. When a merge candidate derived as motion information of the temporal neighboring blocks among the merge candidates or as the combination of the motion information is selected as motion information about the current block, the weights for the current block may be calculated based on the template for the current block and the templates for the reference blocks as described above.

Figure 8:
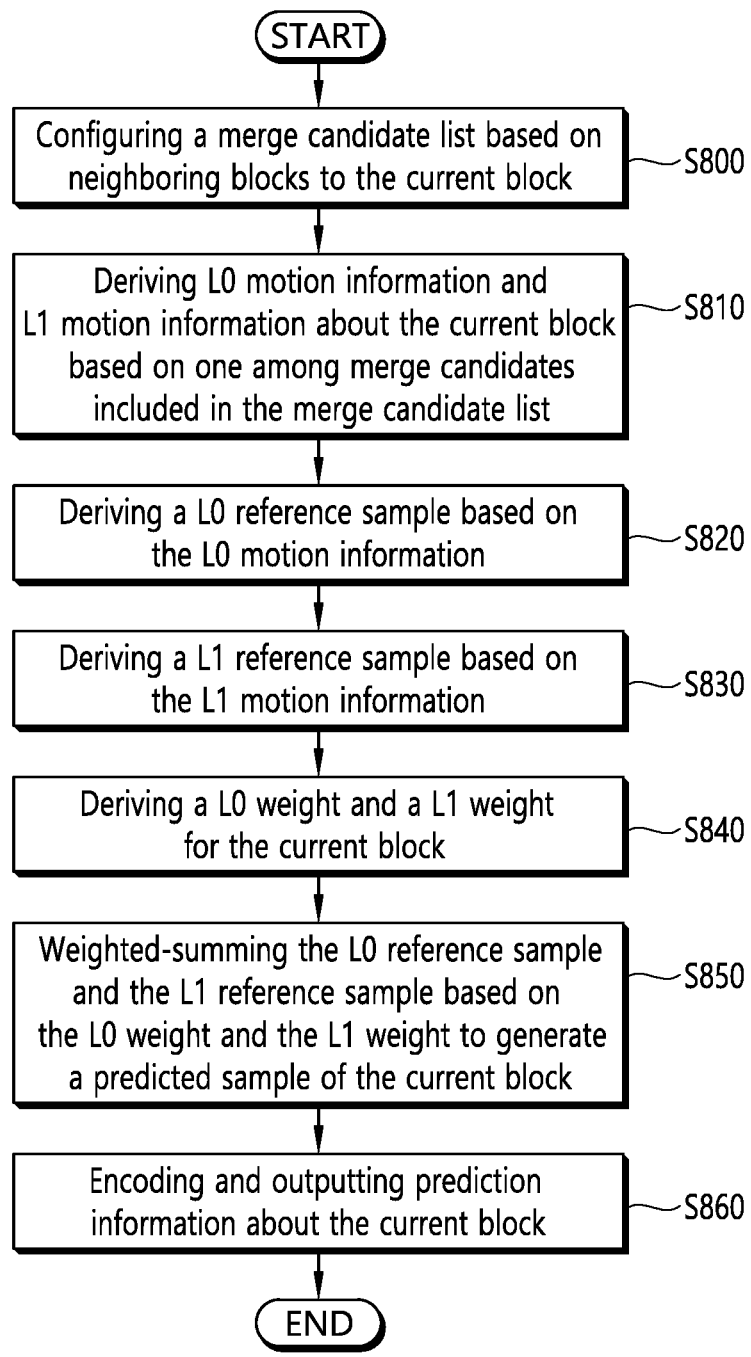
FIG. 8 schematically shows a video encoding method by an encoding device according to the present disclosure.

FIG. 8 shows a video encoding method by an encoding device according to the present disclosure. The method described in FIG. 8 may also be performed by the encoding device as described in FIG. 1. Specifically, for example, S800 to S850 in FIG. 8 may be performed by the predicter of the encoding device, and S860 may be performed by the entropy encoder of the encoding device.

The encoding device configures the merge candidate list based on the neighboring blocks to the current block (S800). The merge candidate list may be configured by including motion information of neighboring blocks to the current block as merge candidates. The neighboring block adjacent to the current block spatially may be called a spatial neighboring block. The spatial neighboring block may include a lower-left neighboring block, a left neighboring block, an upper-right neighboring block, an upper neighboring block, and/or an upper-left neighboring block to the current block. The merge candidate list may be further configured to include motion information of temporally neighboring blocks as merge candidates. The neighboring blocks that are temporally adjacent to the current block may be called temporal neighboring blocks. Further, the merge candidate list may be configured to include the combined bi-prediction candidate or zero vector derived by combining the motion information of the neighboring blocks as a merge candidate. The merge candidate list may be configured based on the motion information of the spatial neighboring block to the current block, the motion information of the temporal neighboring block thereto, and/or the combined bi-prediction candidate.

The encoding device derives L0 motion information and L1 motion information about the current block based on one of the merge candidates included in the merge candidate list (S810). The encoding device may choose one of the merge candidates included in the merge candidate list to derive motion information about the current block. The selected merge candidate may include L0 motion information and L1 motion information of the neighboring block to the current block. The L0 motion information of the merge candidate may be derived as the L0 motion information about the current block, while the L1 motion information of the merge candidate may be derived as the L1 motion information about the current block. The L0 motion information about the current block may include the L0 reference picture index and motion vector L0 (Motion Vector L0, MVL0) indicating the L0 reference picture included in the reference picture list L0 (List 0, L0) for the current block. The L1 motion information about the current block may include an L1 reference picture index and MVL1 indicating an L1 reference picture included in a reference picture list L0 (List 1, L1) for the current block.

The encoding device derives the L0 reference sample based on the L0 motion information (S820). The encoding device may derive the L0 reference sample based on the L0 motion information. The encoding device may derive the L0 reference block indicated by the MVL0 in the L0 reference picture indicated by the L0 reference picture index. The L0 reference block may contain the L0 reference sample.

The encoding device derives an L1 reference sample based on the L1 motion information (S830). The encoding device may derive the L1 reference sample based on the L1 motion information. The encoding device may derive an L1 reference block indicated by the MVL1 in the L1 reference picture indicated by the L1 reference picture index. The L1 reference block may contain the L1 reference sample.

The encoding device derives L0 weight and L1 weight for the current block (S840). The encoding device may derive L0 weight and L1 weight for the current block using various methods.

In an example, the encoding device may derive L0 weight and L1 weight for the current block based on the L0 weight and L1 weight of the selected merge candidate. Specifically, the encoding device may derive the L0 weight of the selected merge candidate as the L0 weight for the current block. The L1 weight of the selected merge candidate may be derived as the L1 weight for the current block by the device.

Further, in another example, the encoding device derives the most-frequently-used value of the L0 weights and L1 weights of the merge candidates contained in the merge candidate list as L0 weight and L1 weight for the current block. Specifically, the encoding device may derive the most-frequently-used value of the L0 weights values of the merge candidates contained in the merge candidate list as the L0 weight for the current block. The device may derive the most-frequently-used value of the L1 weights of the merge candidates contained in the merge candidate list as the L1 weight for the current block.

Further, in another example, the encoding device derives the L0 weight and L1 weight for the current block based on the average value of the L0 weights and the average value of L1 weights of the merge candidates contained in the merge candidate list. Specifically, the encoding device may derive the average value of the L0 weights of the merge candidates contained in the merge candidate list. The device may derive the average value of the L1 weights of the merge candidates contained in the merge candidate list. The encoding device may derive the average value of the L0 weights of the merge candidates as the L0 weight for the current block. The device may derive the average value of the L1 weights of the merge candidates as the L1 weight for the current block.

Further, in another example, the encoding device may derive the L0 weight and L1 weight for the current block based on the median value of the L0 weights and the median value of L1 weights of the merge candidates contained in the merge candidate list. Specifically, the encoding device may derive the median value of the L0 weights of the merge candidates contained in the merge candidate list. The device may derive the median value of the L1 weights of the merge candidates contained in the merge candidate list. The encoding device may derive the median value of the L0 weights of the merge candidates as the L0 weight for the current block. The device may derive the median value of the L1 weights of the merge candidates as the L1 weight for the current block.

Further, in another example, the encoding device may derive a first difference between the picture order count (POC) for the current picture and the POC of the L0 reference picture in which the L0 reference sample is located. The device may derive a second difference between the POC of the current picture and the POC of the L1 reference picture where the L1 reference sample is located. Then, the device may derive the L0 weight and the L1 weight based on the ratio between the first difference and the second difference. Specifically, the encoding device may derive the L0 weight and the L1 weight such that the ratio between the L0 weight and the L1 weight is inversely proportional to the ratio between the first difference and the second difference. That is, the decoding device may derive the L0 weight and the L1 weight based on the ratio between the first difference and the second difference. In this connection, the sum of the L0 weight and the L1 weight may be 1. Specifically, for example, the value of the first difference is 2 and the value of the second difference is 1. In this case, the L0 weight may be derived as ⅓ and the L1 weight as ⅔, such that the ratio between the L0 weight and the L1 weight is inversely proportional to the ratio 2:1 between the first difference and the second difference. In this connection, the first difference may be called a first temporal spacing, and the second difference may be called a second temporal spacing.

Further, in another example, the encoding device may use a template for the current block, a template for the L0 reference block containing the L0 reference sample, and a template for the L1 reference block containing the L1 reference sample to derive the L0 weight and the L1 weight. The encoding device may derive a template for the current block based on neighboring samples to the current block. A template for the L0 reference block containing the L0 reference sample corresponding to the template for the current block may be derived by the device. The device may derive a template for the L1 reference block that contains the L1 reference sample corresponding to the template for the current block. The template for the current block may include left neighboring samples and upper neighboring samples to the current block. The template for the L0 reference block may include left neighboring samples and upper neighboring samples to the L0 reference block. The template for the L1 reference block may include left neighboring samples and upper neighboring samples to the L1 reference block. The encoding device weighted-sums the template for the L0 reference block and the template for the L1 reference block based on multiple L0 weight candidate and L1 weight candidate combinations, thereby to derive multiple weighted-summed templates. The device may also derive the cost between the template for the current block and each of the multiple weighted-summed templates. The encoding device may derive the L0 weight candidate and the L1 weight candidate for the minimum cost of the costs as the L0 weight and the L1 weight, respectively. In this connection, the weighted-summed template may be derived as the sum of the corresponding samples to the template for the L0 reference block to which the L0 weight candidate is applied and to the template for the L1 reference block to which the L1 weight candidate is applied. Further, the cost may be expressed as the SAD (sum of absolute differences) between the corresponding samples to the template for the current block and the weighted-summed template. Further, the cost may be derived based on Equation 4 above. That is, the L0 weight and the L1 weight may be derived based on Equation 4 described above.

In one example, the weights may be derived using a combination of the above methods. Specifically, the method using the motion information of the neighboring block to the current block, that is, the merge candidate weight indicated by the merge index as the weight for the current block, and the method of deriving the weight based on the POC difference may be selectively applied case-by-case. The method for deriving the weight based on the POC difference and a method for deriving the weight based on templates for the current block and reference block may be selectively applied case-by-case.

In one example, when the first difference and the second difference are the same, each of L0 weight and L1 weight may be derived as ½. When the first difference and the second difference are not the same, a method for deriving the L0 weight and the L1 weight for the current block based on the template for the current block, the template for the L0 reference block, and the template for the L1 reference block may be applied.

Further, in another example, when the merge candidate selected for motion information about the current block is the motion information of the spatial neighboring block to the current block, the L0 weight and the L1 weight of the merge candidate may be applied as the L0 weight and the L1 weight for the current block respectively. When the selected merge candidate is not the motion information of the spatial neighboring block, each of the L0 weight and L1 weight for the current block may be derived as ½.

Further, in another example, if the merge candidate selected for motion information about the current block is motion information of a spatial neighboring block to the current block, the L0 weight and the L1 weight of the merge candidate may be applied as the L0 weight and the L1 weight for the current block respectively. If the selected merge candidate is not the motion information of the spatial neighboring block, a method for deriving the L0 weight and the L1 weight for the current block based on the template for the current block, the template for the L0 reference block and the template for the L1 reference block as described above may be applied.

In one example, an encoding device may generate and signal a weight index representing the L0 weight and the L1 weight for the current block. Specifically, the encoding device may generate a weight index indicating one of L0 weight candidate and L1 weight candidate combinations. In this connection, the L0 weight candidate and the L1 weight candidate combinations may be predefined. Alternatively, the combinations may be derived based on the merge candidates included in the merge candidate list. The weight index may also be signaled using a bitstream.

In one example, the encoding device may parse a merge flag indicating whether the merge mode is applied to the current block. The weight index may be signaled only if the value of the merge flag is equal to 1. Further, the weight index may be signaled on a CU basis or on a PU basis.

Further, the number of bits of the weight index may be variable. For example, the binary code of the weight index may be derived as shown in Table 3 above. Further, the encoding device may derive the L0 weight predictor and the L1 weight predictor based on the at least one of the merge candidates. The weight index may represent the difference values between the index values corresponding to the L0 weight predictor and the L1 weight predictor among the index values for the combinations and the index values for the L0 weight and the L1 weight for the current block. Further, the L0 weight and L1 weight of the selected merge candidate may be derived as the L0 weight predictor and the L1 weight predictor, respectively. A binary code representing the weight index may be assigned a variable length (bits) based on the difference value. For example, a binary code indicating the weight index may be derived as shown in Table 4 above.

The encoding device generates a predicted sample of the current block by weighted-summing the L0 reference sample and the L1 reference sample based on the L0 weight and the L1 weight in operation S850. The encoding device may apply the L0 weight to the L0 reference sample and apply the L1 weight to the L1 reference sample. Next, the encoding device may generate the predicted sample by summing the L0 reference sample with the L0 weight applied thereto and the L1 reference sample with the L1 weight applied thereto. The predicted sample may be generated based on Equation 2 described above.

The encoding device encodes prediction information about the current block and outputs the encoded information (S860). The encoding device may generate a merge index indicating the selected merge candidate to derive motion information about the current block. The encoding device may encode and output the merge index. The merge index may also be included in the prediction information. Further, the encoding device may generate the weight index, and encode and output the index. The weight index may also be included in the prediction information.

Further, the encoding device may generate a residual sample based on the original sample and the derived predicted sample. The encoding device may generate information about the residual based on the residual sample. Information about the residual may include a transform coefficient for the residual sample. The encoding device may derive the reconstructed sample based on the predicted sample and the residual sample. That is, the encoding device may derive the reconstructed sample by summing the predicted sample and the residual sample. Further, the encoding device may encode information about the residual and output the same in the form of a bit stream. The bitstream may be transmitted to a decoding device using a network or storage medium.

Figure 9:
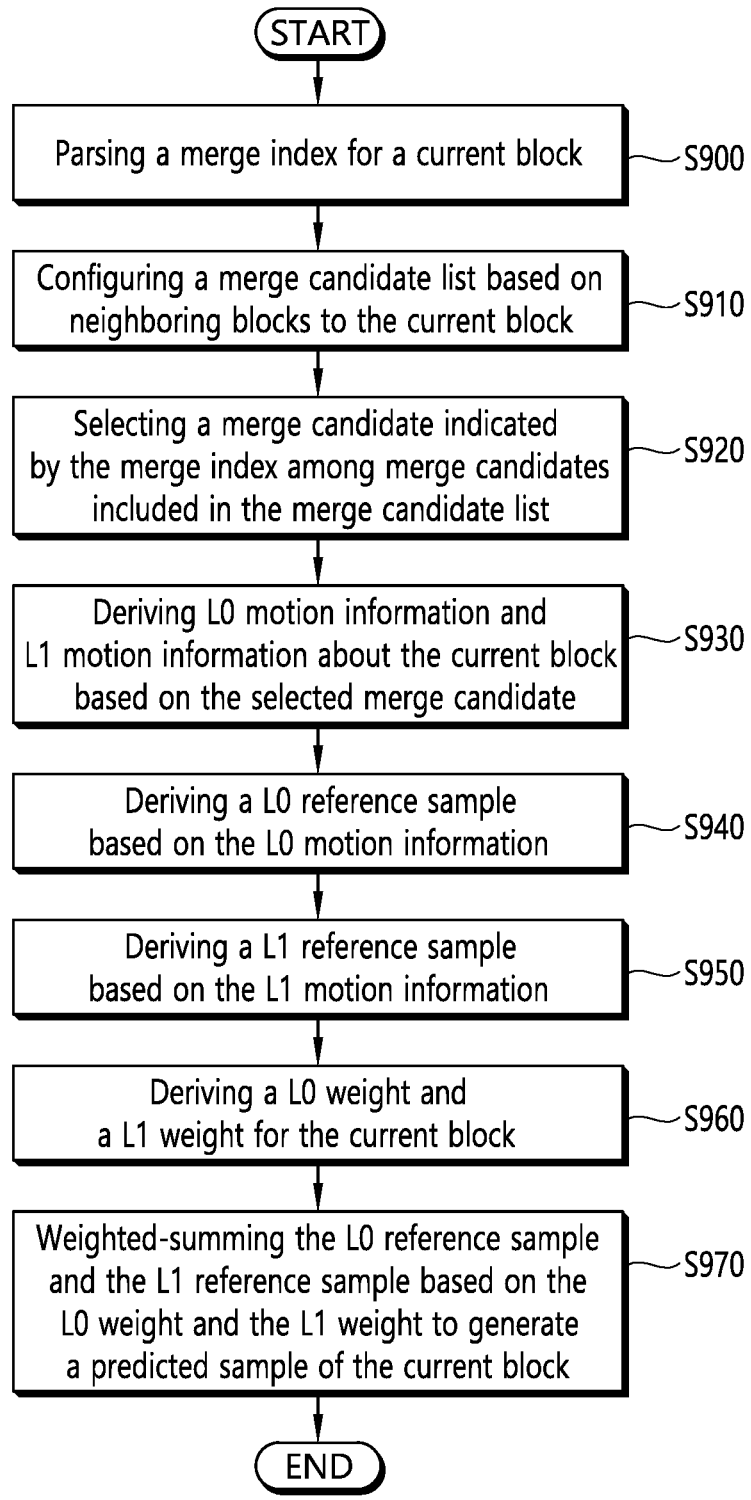
FIG. 9 schematically shows a video decoding method by a decoding device according to the present disclosure.

FIG. 9 outlines the video decoding method by the decoding device according to the present disclosure. The method described in FIG. 9 may also be performed by the decoding device described in FIG. 2. Specifically, for example, S900 may be performed by an entropy decoder of the decoding device, and S910 through S970 may be performed by a predictor of the decoding device.

The decoding device parses the merge index of the current block (S900). When merge mode is applied to the current block, the decoding device may receive the merge index over a bitstream. The merge index may indicate one of the merge candidates contained in the merge candidate list for the current block.

The decoding device configures the merge candidate list based on neighboring blocks to the current block (S910). The merge candidate list may be configured to include motion information of neighboring blocks adjacent to the current block as merge candidates. The neighboring block adjacent to the spatial may be called a spatial neighboring block. The spatial neighboring block may include a lower-left neighboring block, a left neighboring block, an upper-right neighboring block, an upper neighboring block, and/or an upper-left neighboring block to the current block. The merge candidate list may be further configured to include motion information of the temporal neighboring block as a merge candidate. The neighboring blocks that are temporally adjacent to the current block may be called temporal neighboring blocks. Further, the merge candidate list may be configured to include to the combined bi-prediction candidate or zero vector derived by combining the motion information of the neighboring blocks. The merge candidate list may be configured based on the motion information of the spatial neighboring block for the current block, the motion information of the temporal neighboring block, and/or the combined bi-prediction candidate.

The decoding device selects a merge candidate indicated by the merge index among the merge candidates included in the merge candidate list (S920). The merge index may indicate one of the merge candidates contained in the merge candidate list. The merge candidate indicated by the merge index may be selected to derive motion information about the current block.

The decoding device derives L0 motion information and L1 motion information about the current block based on the selected merge candidate (S930). The selected merge candidate may include L0 motion information and L1 motion information of the neighboring block to the current block. The L0 motion information of the selected merge candidate may be derived as the L0 motion information about the current block, while the L1 motion information of the selected merge candidate may be derived as the L1 motion information about the current block. The L0 motion information about the current block may include the L0 reference picture index and motion vector L0 (Motion Vector L0, MVL0) indicating the L0 reference picture included in the reference picture list L0 (List 0, L0) for the current block. The L1 motion information about the current block may include an L1 reference picture index and MVL1 indicating an L1 reference picture included in a reference picture list L0 (List 1, L1) for the current block.

The decoding device derives the L0 reference sample based on the L0 motion information (S940). The decoding device may derive the L0 reference sample based on the L0 motion information. The decoding device may derive the L0 reference block indicated by the MVL0 in the L0 reference picture indicated by the L0 reference picture index. The L0 reference block may contain the L0 reference sample.

The decoding device derives an L1 reference sample based on the L1 motion information (S950). The decoding device may derive the L1 reference sample based on the L1 motion information. The decoding device may derive an L1 reference block indicated by the MVL1 in the L1 reference picture indicated by the L1 reference picture index. The L1 reference block may contain the L1 reference sample.

The decoding device derives L0 weight and L1 weight for the current block (S960). The decoding device may derive L0 weight and L1 weight for the current block using various methods.

In one example, the decoding device may derive L0 weight and L1 weight for the current block based on the L0 weight and L1 weight of the selected merge candidate. Specifically, the decoding device may derive the L0 weight of the selected merge candidate as the L0 weight for the current block. The L1 weight of the selected merge candidate may be derived as the L1 weight for the current block.

Further, in another example, the decoding device may derive the most-frequently-used value of the values of L0 weights and L1 weights of the merge candidates included in the merge candidate list as L0 weight and L1 weight for the current block. Specifically, the decoding device may derive the most-frequently-used value among the L0 weights values of the merge candidates included in the merge candidate list as the L0 weight for the current block. The most-frequently-used value of the L1 weights of the merge candidates included in the merge candidate list may be derived as the L1 weight for the current block.

Further, in another example, the decoding device may derive the L0 weight and L1 weight for the current block based on the average value of the L0 weights and the average value of L1 weights of the merge candidates included in the merge candidate list. Specifically, the decoding device may derive the average value of L0 weights of the merge candidates included in the merge candidate list. The device may derive the average value of the L1 weights of the merge candidates included in the merge candidate list. The decoding device may derive the average value of the L0 weights of the merge candidates as the L0 weight for the current block. The average value of the L1 weights of the merge candidates may be derived as the L1 weight for the current block.

Further, in another example, the decoding device may derive L0 weight and L1 weight for the current block based on the median value of the L0 weights and the median value of L1 weights of the merge candidates included in the merge candidate list. Specifically, the decoding device may derive the median value of the L0 weights of the merge candidates included in the merge candidate list. The device may derive the median value of the L1 weights of the merge candidates included in the merge candidate list. The decoding device may derive the median value of the L0 weights of the merge candidates as the L0 weight for the current block. The median value of the L1 weights of the merge candidates may be derived as the L1 weight for the current block.

Further, in another example, the decoding device may receive information about the L0 weight and the L1 weight. Then, the L0 weight and the L1 weight may be derived based on the received information. Specifically, the decoding device may parse a weight index indicating one of L0 weight candidate and L1 weight candidate combinations. In this connection, the L0 weight candidate and the L1 weight candidate combinations may be pre-defined. Alternatively, the merge candidate may be derived based on the merge candidates included in the candidate list. The weight index may be signaled using a bitstream. The decoding device may derive the L0 weight candidate and the L1 weight candidate of the combination indicated by the weight index among the combinations as the L0 weight and the L1 weight, respectively.

In one example, the decoding device may parse a merge flag indicating whether the merge mode is applied to the current block. The weight index may be parsed only if the value of the merge flag is 1. Alternatively, the weight index may be signaled on a CU basis or on a PU basis.

In one example, the weight index may be signaled only if the value of the merge index is 1. Further, the weight index may be signaled on a CU basis or on a PU basis.

Further, the number of bits of the weight index may be variable. For example, the weight index may be derived as shown in Table 3 above. Further, the decoding device may derive the L0 weight predictor and the L1 weight predictor based on the at least one of the merge candidates. The weight index may represent the difference values between the index values corresponding to the L0 weight predictor and the L1 weight predictor among the index values for the combinations and the index values for the L0 weight and the L1 weight for the current block. Further, the L0 weight and L1 weight of the selected merge candidate may be derived as the L0 weight predictor and the L1 weight predictor, respectively. A binary code representing the weight index may be assigned a variable length (bits) based on the difference value. For example, a binary code indicating the weight index may be derived as shown in Table 4 above.

Further, in another example, the decoding device may derive a first difference between the picture order count (POC) for the current picture and the POC of the L0 reference picture in which the L0 reference sample is located. The device may derive a second difference between the POC of the current picture and the POC of the L1 reference picture where the L1 reference sample is located. Then, the device may derive the L0 weight and the L1 weight based on the ratio between the first difference and the second difference. Specifically, the decoding device may derive the L0 weight and the L1 weight such that the ratio between the L0 weight and the L1 weight is inversely proportional to the ratio between the first difference and the second difference. That is, the decoding device may derive the L0 weight and the L1 weight based on the ratio between the first difference and the second difference. In this connection, the sum of the L0 weight and the L1 weight may be 1. Specifically, for example, the value of the first difference is 2 and the value of the second difference is 1. In this case, the L0 weight may be derived as ⅓ and the L1 weight as ⅔, such that the ratio between the L0 weight and the L1 weight is inversely proportional to the ratio 2:1 between the first difference and the second difference. In this connection, the first difference may be called a first temporal spacing, and the second difference may be called a second temporal spacing.

Further, in another example, the decoding device may use a template for the current block, a template for the L0 reference block containing the L0 reference sample, and a template for the L1 reference block containing the L1 reference sample to derive the L0 weight and the L1 weight. The decoding device may derive a template for the current block based on neighboring samples to the current block. A template for the L0 reference block containing the L0 reference sample corresponding to the template for the current block may be derived by the device. The device may derive a template for the L1 reference block that contains the L1 reference sample corresponding to the template for the current block. The template for the current block may include left neighboring samples and upper neighboring samples to the current block. The template for the L0 reference block may include left neighboring samples and upper neighboring samples to the L0 reference block. The template for the L1 reference block may include left neighboring samples and upper neighboring samples to the L1 reference block. The decoding device weighted-sums the template for the L0 reference block and the template for the L1 reference block based on multiple L0 weight candidate and L1 weight candidate combinations, thereby to derive multiple weighted-summed templates. The device may also derive the cost between the template for the current block and each of the multiple weighted-summed templates. The decoding device may derive the L0 weight candidate and the L1 weight candidate for the minimum cost of the costs as the L0 weight and the L1 weight, respectively. In this connection, the weighted-summed template may be derived as the sum of the corresponding samples to the template for the L0 reference block to which the L0 weight candidate is applied and to the template for the L1 reference block to which the L1 weight candidate is applied. Further, the cost may be expressed as the SAD (sum of absolute differences) between the corresponding samples to the template for the current block and the weighted-summed template. Further, the cost may be derived based on Equation 4 above. That is, the L0 weight and the L1 weight may be derived based on Equation 4 described above.

In one example, the weights may be derived using a combination of the above methods. Specifically, the method using the motion information of the neighboring block to the current block, that is, the merge candidate weight indicated by the merge index as the weight for the current block, and the method of deriving the weight based on the POC difference may be selectively applied case-by-case. The method for deriving the weight based on the POC difference and a method for deriving the weight based on templates for the current block and reference block may be selectively applied case-by-case.

In one example, when the first difference and the second difference are the same, each of L0 weight and L1 weight may be derived as ½. When the first difference and the second difference are not the same, a method for deriving the L0 weight and the L1 weight for the current block based on the template for the current block, the template for the L0 reference block, and the template for the L1 reference block may be applied.

Further, in another example, when the merge candidate selected for motion information about the current block is the motion information of the spatial neighboring block to the current block, the L0 weight and the L1 weight of the merge candidate may be applied as the L0 weight and the L1 weight for the current block respectively. When the selected merge candidate is not the motion information of the spatial neighboring block, each of the L0 weight and L1 weight for the current block may be derived as ½.

Further, in another example, when the merge candidate selected for motion information about the current block is motion information of a spatial neighboring block to the current block, the L0 weight and the L1 weight of the merge candidate may be applied as the L0 weight and the L1 weight for the current block respectively. When the selected merge candidate is not the motion information of the spatial neighboring block, a method for deriving the L0 weight and the L1 weight for the current block based on the template for the current block, the template for the L0 reference block and the template for the L1 reference block as described above may be applied.

The decoding device generates a predicted sample of the current block by weighted-summing the L0 reference sample and the L1 reference sample based on the L0 weight and the L1 weight in operation S970. The decoding device may apply the L0 weight to the L0 reference sample and apply the L1 weight to the L1 reference sample. Next, the decoding device may generate the predicted sample by summing the L0 reference sample with the L0 weight applied thereto and the L1 reference sample with the L1 weight applied thereto. The predicted sample may be generated based on Equation 2 described above.

In one example, although not shown in the drawings, the decoding device may use the predicted sample as a reconstructed sample according to the prediction mode type. Alternatively, the reconstructed sample may be generated by adding a residual sample to the predicted sample. When the decoding device has a residual sample for the current block, the device may receive information about the residual for the current block from the bitstream. Information about the residual may include transform coefficients for the residual sample. The decoding device may derive the residual sample (or residual sample array) for the current block based on the residual information. The decoding device may generate a reconstructed sample based on the predicted sample and the residual sample. A reconstructed block or reconstructed picture may be derived based on the reconstructed sample. Hereinafter, the decoding device may apply an in-loop filtering procedure such as deblocking filtering and/or SAO procedures to the reconstructed picture in order to improve the subjective/objective picture quality as needed.

According to the present disclosure as described above, inter prediction may be performed based on weights for L0 motion information and L1 motion information on the current block. This may improve the prediction accuracy of the current block.

Further, according to the present disclosure, the amount of additional information for weights for L0 motion information and L1 motion information about the current block may be reduced. This may improve overall coding efficiency.

In the above-described embodiments, methods are described based on a flowchart as a series of steps or blocks. However, the present disclosure is not limited to the order of steps s. Some steps may occur simultaneously or in a different order than the order of the steps described above. Further, those skilled in the art will appreciate that the step shown in the flowchart is not exclusive. It will be understood that other steps may be included or that one or more steps in the flowchart may be deleted without affecting the scope of the present disclosure.

The method according to the present disclosure described above may be implemented in software form. The encoding device and/or decoding device according to the present disclosure may be included in a device that performs video processing such as for example, a TV, a computer, a smart phone, a set-top box, or a display device.

When the embodiments of the present disclosure are implemented in software, the above-described method may be implemented as a module (process, function, etc.) that performs the functions described above. The module is stored in memory, and is executed by a processor. The memory may be internal or external to the processor, and may be coupled to the processor by various well known means. The processor may include an application-specific integrated circuit (ASIC), other chipset, logic circuit and/or data processing device. The memory may include read-only memory (ROM), random access memory (RAM), flash memory, memory card, storage media and/or other storage devices.

What is claimed is:

1. An image decoding method performed by a decoding apparatus, the method comprising:
    parsing a merge index for a current block;
    configuring a merge candidate list based on neighboring blocks to the current block;
    selecting a merge candidate represented by the merge index among merge candidates included in the merge candidate list;
    deriving L0 motion information and L1 motion information for the current block based on the selected merge candidate;
    deriving a L0 reference sample based on the L0 motion information;
    deriving a L1 reference sample based on the L1 motion information;
    deriving a L0 weight and a L1 weight for the current block; and
    weighted-summing the L0 reference sample and the L1 reference sample based on the L0 weight and the L1 weight to generate a predicted sample of the current block,
    wherein deriving the L0 weight and L1 weight for the current block includes:
    parsing a weight index representing one of L0 weight candidate and L1 weight candidate combinations; and
    deriving a L0 weight candidate and a L1 weight candidate of a combination represented by the weight index among the combinations as the L0 weight and the L1 weight for the current block respectively,
    wherein the method further includes parsing a merge flag representing whether a merge mode is applied to the current block, and
    wherein the weight index is parsed when a value of the merge flag is 1.

2. The method of claim 1, wherein the weight index is parsed in a coding unit level.

3. The method of claim 1, wherein the L0 weight and L1 weight are derived based on a following Equation:

$$Cost_{distortion} = \sum_{(i,j) \in BlockSize} |Block_{cur}(i, j) - (w \times Block_{ref0}(i, j) + (1 - w) \times Block_{ref1}(i, j))|$$

where $Cost_{distortion}$ represents a cost to derive the L0 weight and the L1 weight; i and j represent a x component and a y component of a sample in a block respectively; $Block_{cur}$ represents a sample value of the current block; $Block_{ref0}$ represents a sample value of the L0 reference block; $Block_{ref1}$ represents a sample value of the L1 reference block; w represent the L0 weight; and (1−w) represents the L1 weight.

4. An image encoding method performed by an encoding apparatus, the method comprising:
    configuring a merge candidate list based on neighboring blocks to a current block;
    deriving L0 motion information and L1 motion information for the current block based on a merge candidate among merge candidates included in the merge candidate list;
    deriving a L0 reference sample based on the L0 motion information;
    deriving a L1 reference sample based on the L1 motion information;
    deriving a L0 weight and a L1 weight for the current block;
    weighted-summing the L0 reference sample and the L1 reference sample based on the L0 weight and the L1 weight to generate a predicted sample of the current block,
    encoding image information including a weight index representing one of L0 weight candidate and L1 weight candidate combinations,
    wherein the image information includes a merge flag representing whether a merge mode is applied to the current block, and
    wherein the weight index is included when a value of the merge flag is 1.

5. The method of claim 4, wherein the weight index is signaled in a coding unit level.

6. The method of claim 4, wherein the L0 weight and L1 weight are derived based on a following Equation:

$$Cost_{distortion} = \sum_{(i,j) \in BlockSize} |Block_{cur}(i, j) - (w \times Block_{ref0}(i, j) + (1 - w) \times Block_{ref1}(i, j))|$$

where $Cost_{distortion}$ represents a cost to derive the L0 weight and the L1 weight; i and j represent a x component and a y component of a sample in a block respectively; $Block_{cur}$ represents a sample value of the current block; $Block_{ref0}$ represents a sample value of the L0 reference block; $Block_{ref1}$ represents a sample value of the L1 reference block; w represent the L0 weight; and (1−w) represents the L1 weight.

7. A non-transitory computer readable medium storing encoded information causing a decoder to perform an image decoding method comprising:
   parsing a merge index for a current block;
   configuring a merge candidate list based on neighboring blocks to the current block;
   selecting a merge candidate represented by the merge index among merge candidates included in the merge candidate list;
   deriving L0 motion information and L1 motion information for the current block based on the selected merge candidate;
   deriving a L0 reference sample based on the L0 motion information;
   deriving a L1 reference sample based on the L1 motion information;
   deriving a L0 weight and a L1 weight for the current block; and
   weighted-summing the L0 reference sample and the L1 reference sample based on the L0 weight and the L1 weight to generate a predicted sample of the current block,
   wherein deriving the L0 weight and L1 weight for the current block includes:
   parsing a weight index representing one of L0 weight candidate and L1 weight candidate combinations; and
   deriving a L0 weight candidate and a L1 weight candidate of a combination represented by the weight index among the combinations as the L0 weight and the L1 weight for the current block respectively,
   wherein the method further includes parsing a merge flag representing whether a merge mode is applied to the current block, and
   wherein the weight index is parsed when a value of the merge flag is 1.

8. The non-transitory computer readable medium of claim 7, wherein the weight index is parsed in a coding unit level.

9. The non-transitory computer readable medium of claim 7, wherein the L0 weight and L1 weight are derived based on a following Equation:

$$Cost_{distortion} = \sum_{(i,j) \in BlockSize} |Block_{cur}(i, j) - (w \times Block_{ref0}(i, j) + (1 - w) \times Block_{ref1}(i, j))|$$

where $Cost_{distortion}$ represents a cost to derive the L0 weight and the L1 weight; i and j represent a x component and a y component of a sample in a block respectively; $Block_{cur}$ represents a sample value of the current block; $Block_{ref0}$ represents a sample value of the L0 reference block; $Block_{ref1}$ represents a sample value of the L1 reference block; w represent the L0 weight; and (1−w) represents the L1 weight.

* * * * *